(12) United States Patent
Okuma (10) Patent No.: US 12,212,211 B2
(45) Date of Patent: Jan. 28, 2025

(54) CENTRIFUGAL COMPRESSOR

(71) Applicant: KABUSHIKI KAISHA TOYOTA JIDOSHOKKI, Aichi (JP)

(72) Inventor: Taito Okuma, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 26 days.

(21) Appl. No.: 18/105,456

(22) Filed: Feb. 3, 2023

(65) Prior Publication Data

US 2023/0283141 A1 Sep. 7, 2023

(30) Foreign Application Priority Data

Mar. 3, 2022 (JP) ................................. 2022-032695

(51) Int. Cl.
*H02K 5/22* (2006.01)
*B60H 1/32* (2006.01)
(Continued)

(52) U.S. Cl.
CPC ........... *H02K 5/225* (2013.01); *B60H 1/3223* (2013.01); *F04D 17/10* (2013.01); *F04D 25/06* (2013.01);
(Continued)

(58) Field of Classification Search
CPC .......... H02K 5/225; H02K 11/33; H02K 5/10; H02K 7/14; H02K 11/30; H02K 2203/06;
(Continued)

(56) References Cited

U.S. PATENT DOCUMENTS 5,518,427 A * 5/1996 Kan ..................... H01R 13/521
439/876
7,207,187 B2 4/2007 Funahashi et al.
(Continued)

FOREIGN PATENT DOCUMENTS

JP 2002-188573 A 7/2002
JP 2003-322082 A 11/2003
(Continued)

OTHER PUBLICATIONS

Bestech, Modulus of Elasticity—Young Modulus for some common Materials https://www.bestech.com.au/wp-content/uploads/Modulus-of-Elasticity.pdf (Year: 2016).*

*Primary Examiner* — Dominick L Plakkoottam
(74) *Attorney, Agent, or Firm* — Greenblum & Bernstein, P.L.C.

(57) ABSTRACT

A centrifugal compressor includes a compressor impeller, a motor, an inverter, a housing including a motor chamber and an inverter chamber, a conductive member, an insertion hole, and a resin member sealing the insertion hole. A pressure in the motor chamber is higher than that in the inverter chamber. The resin member includes a first resin portion fixed to the housing and a second resin portion which is covered with the first resin portion and which covers the conductive member, the second resin portion having a Young's modulus smaller than that of the first resin portion. The first resin portion and the second resin portion, and the second resin portion and the conductive member are coupled by insert-molding.

3 Claims, 3 Drawing Sheets (51) Int. Cl.
*F04D 17/10* (2006.01)
*F04D 25/06* (2006.01)
*H02K 5/10* (2006.01)
*H02K 11/30* (2016.01)
*H02K 11/33* (2016.01)

(52) U.S. Cl.
CPC ............... *H02K 5/10* (2013.01); *H02K 11/30* (2016.01); *H02K 11/33* (2016.01)

(58) Field of Classification Search
CPC ....... B60H 1/3223; F04D 25/06; F04D 17/10; F04D 29/624; F04D 25/068; F04D 25/0693; F04D 25/0606; F04D 25/08; F04D 13/06; F04D 29/083; F04C 2240/803; F04C 2240/808; F04C 2240/30; F04C 23/008; F04C 2240/403; F04C 23/02; F04C 27/00; F04C 29/0085
See application file for complete search history.

(56) References Cited

U.S. PATENT DOCUMENTS

| | | | |
|---|---|---|---|
| 10,122,237 | B2 | 11/2018 | Hattori et al. |
| 10,634,043 | B2 * | 4/2020 | Sasaki .................. F01D 25/183 |
| 10,741,478 | B2 * | 8/2020 | Soda ..................... H01L 23/495 |
| 2014/0037470 | A1 * | 2/2014 | Kinoshita ............. F04C 23/008 |
| | | | 417/410.1 |
| 2014/0294628 | A1 * | 10/2014 | Yano .................. F04C 18/0215 |
| | | | 417/410.5 |
| 2016/0141953 | A1 * | 5/2016 | Okada ..................... F04B 35/04 |
| | | | 417/415 |
| 2022/0006366 | A1 * | 1/2022 | Ikeya ..................... F02B 39/10 |

FOREIGN PATENT DOCUMENTS

| | | | | |
|---|---|---|---|---|
| JP | 2011058388 A | * | 3/2011 | ............ F04C 23/008 |
| JP | 2014-176160 A | | 9/2014 | |
| JP | 2020-070739 A | | 5/2020 | |
| KR | 20210011804 A | * | 2/2021 | ......... F04C 29/0085 |
| WO | WO2017/141877 A1 | | 8/2017 | |
| WO | WO-2017221864 A1 | * | 12/2017 | ......... B60R 16/0215 |

* cited by examiner

CENTRIFUGAL COMPRESSOR

CROSS-REFERENCE TO RELATED APPLICATION

This application claims priority to Japanese Patent Application No. 2022-032695 filed on Mar. 3, 2022, the entire disclosure of which is incorporated herein by reference.

BACKGROUND ART

The present disclosure relates to a centrifugal compressor.

For example, as disclosed in International Patent Application Publication No. 2017/141877, there is known a centrifugal compressor including a compressor impeller, a motor, an inverter, and a housing. The compressor impeller is configured to compress fluid. The motor is driven to rotate the compressor impeller. The inverter is configured to drive the motor. The housing includes a motor chamber and an inverter chamber. The motor chamber accommodates the motor. The inverter chamber accommodates the inverter.

The above-described centrifugal compressor includes a conductive member electrically connecting the motor to the inverter. The housing has an insertion hole through which the conductive member is inserted. The insertion hole extends through the housing. In addition, the centrifugal compressor includes a resin member holding the conductive member. The resin member is fixed to the housing while holding the conductive member. The resin member seals the insertion hole around the conductive member. Then, a power from the inverter is supplied to the motor through the conductive member to drive the motor.

The above-described centrifugal compressor may be operated in a state where a pressure in the motor chamber is greater than a pressure in the inverter chamber. Here, a detaching force by which the resin member and the conductive member are partially detached from each other may be generated due to a difference in a coefficient of linear expansion between the resin member and the conductive member. Air flowing from the motor chamber into the insertion hole may flow into the inverter chamber through a space between the resin member and conductive member. When flowing into the inverter chamber, the air is cooled to be likely to cause condensation in the inverter chamber. The condensation in the inverter chamber may have a negative influence on the inverter to cause a decrease of reliability of the centrifugal compressor.

SUMMARY

In accordance with an aspect of the present disclosure, there is provided a centrifugal compressor that includes a compressor impeller configured to compress fluid, a motor configured to rotate the compressor impeller, an inverter configured to drive the motor, a housing including a motor chamber in which the motor is accommodated and an inverter chamber in which the inverter is accommodated, a conductive member electrically connecting the motor to the inverter, an insertion hole that extends through the housing and through which the conductive member is inserted, and a resin member fixed to the housing while holding the conductive member and sealing the insertion hole around the conductive member. A pressure in the motor chamber is higher than a pressure in the inverter chamber. The resin member includes a first resin portion fixed to the housing and a second resin portion which is covered with the first resin portion and which covers the conductive member, the second resin portion having a Young's modulus smaller than a Young's modulus of the first resin portion. The first resin portion and the second resin portion, and the second resin portion and the conductive member are each coupled by insert-molding.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

Figure 1:
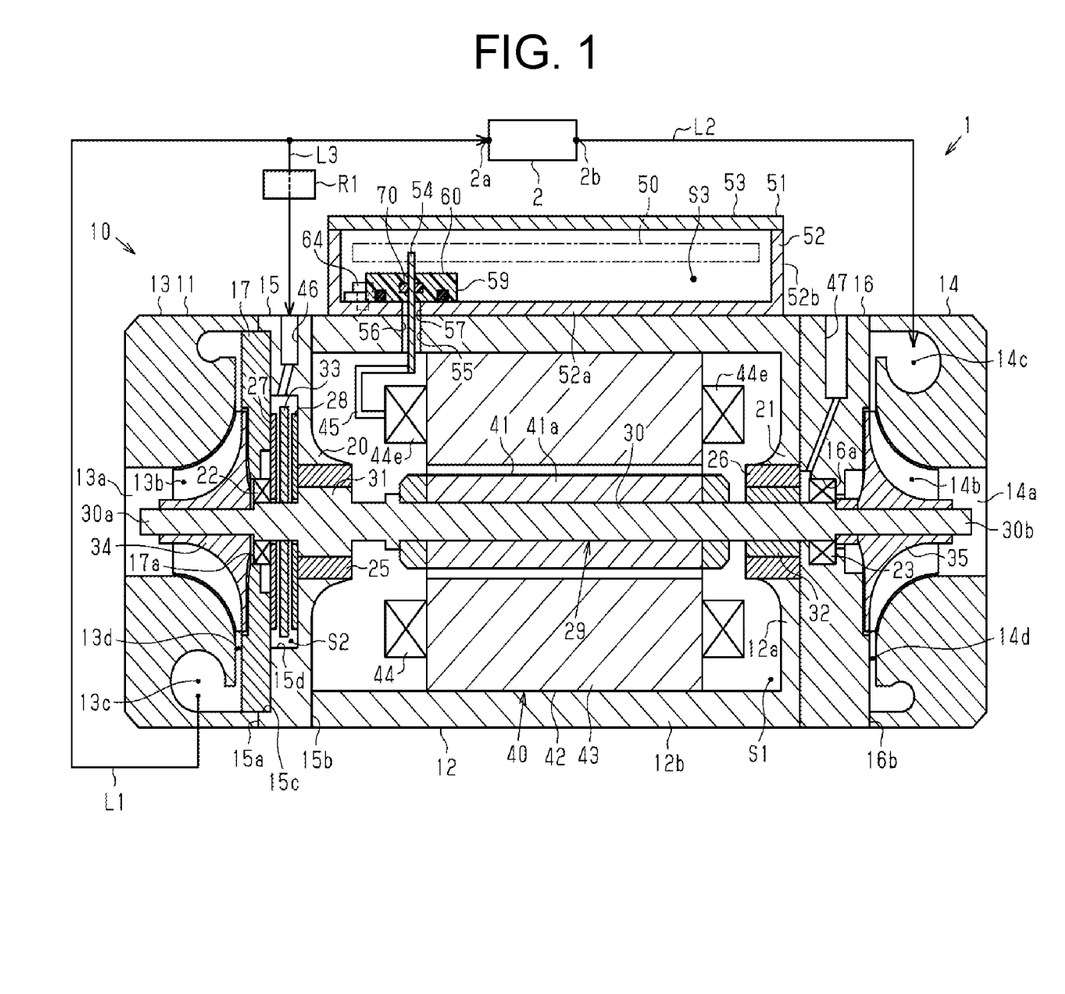
FIG. 1 is a longitudinal cross-sectional view of a centrifugal compressor according to an embodiment of the present disclosure.
Figure 2:
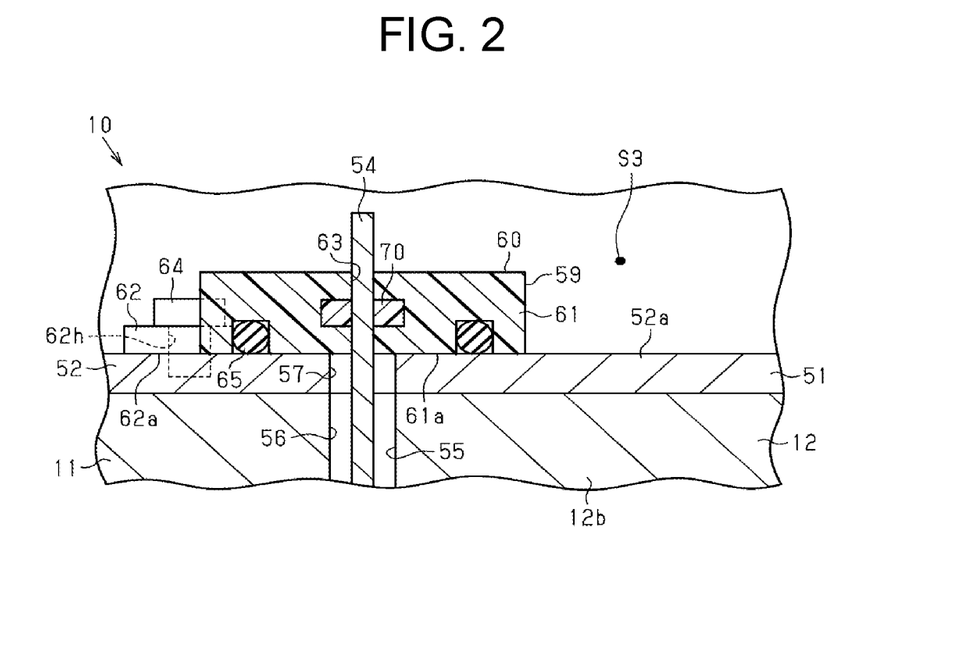
FIG. 2 is an enlarged cross-sectional view illustrating a part of the centrifugal compressor.
Figure 3:
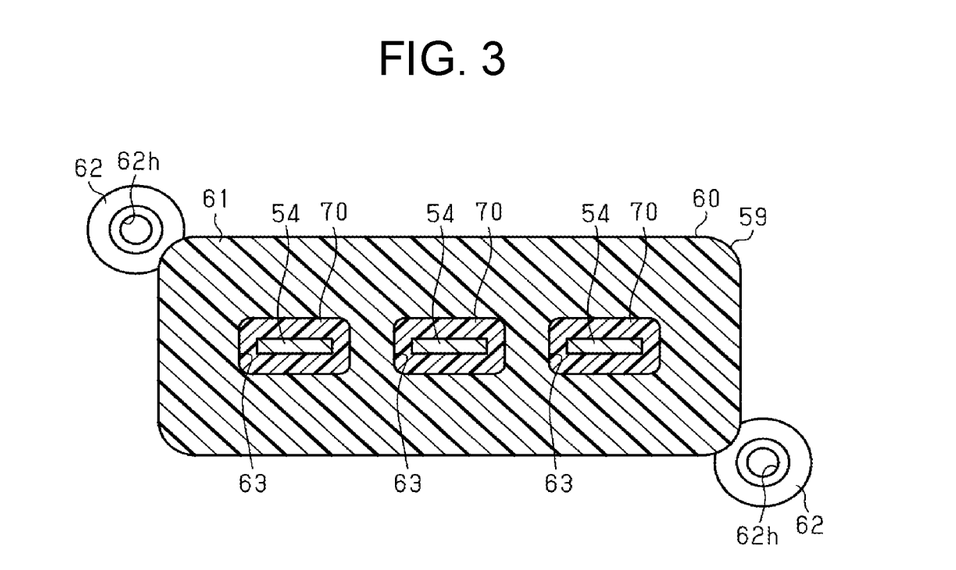
FIG. 3 is a cross-sectional top view illustrating an arrangement of a first resin portion, and second resin portions according to the embodiment.

The following will describe an embodiment of a centrifugal compressor according to the present disclosure with reference to FIGS. 1 to 3. The centrifugal compressor according to the present embodiment is mounted on a fuel cell vehicle. The centrifugal compressor serves as a part of a fuel cell system mounted on the fuel cell vehicle.

<Fuel Cell System 1>

As illustrated in FIG. 1, a fuel cell system 1 includes a fuel cell stack 2 and a centrifugal compressor 10. The centrifugal compressor 10 supplies air as fluid in the present disclosure to the fuel cell stack 2. The fuel cell stack 2 is formed of a plurality of fuel cells (not illustrated). Each of the fuel cells is formed by stacking an oxygen electrode, a hydrogen electrode, and an electrolyte film interposed between the oxygen electrode and the hydrogen electrode. The fuel cell stack 2 generates electricity by a chemical reaction between hydrogen corresponding to fuel gas and oxygen in air. The fuel cell stack 2 is electrically connected to a traveling motor (not illustrated). The traveling motor is driven by an electric power generated by the fuel cell stack 2 as a power supply. A motive power of the traveling motor is transmitted to a drive shaft through a power transmission mechanism. Thus, a vehicle travels at a vehicle speed according to an accelerator position of an accelerator.

The fuel cell system 1 includes a supply pipe L1, a discharge pipe L2, and a branch pipe L3. The supply pipe L1 is connected to an air inlet 2a of the fuel cell stack 2. Air is supplied to the fuel cell stack 2 through the supply pipe L1. The discharge pipe L2 is connected to an air outlet 2b of the fuel cell stack 2. The air from the fuel cell stack 2 is discharged into the discharge pipe L2.

The branch pipe L3 branches off from the supply pipe L1. The air flowing through the supply pipe L1 branches off and flows through the branch pipe L3. An intercooler R1 is provided on the branch pipe L3. The intercooler R1 is configured to cool the air flowing through the branch pipe L3.

<Centrifugal Compressor 10>

The centrifugal compressor 10 includes a housing 11. The housing 11 is made of metal, such as aluminum. The housing 11 includes a motor housing 12, a compressor housing 13, a turbine housing 14, a first plate 15, a second plate 16, and a sealing plate 17.

The motor housing 12 has a tubular shape. The motor housing 12 includes a plate-like end wall 12a and a peripheral wall 12b. The peripheral wall 12b has a tubular shape and extends from an outer peripheral portion of the end wall 12a. The first plate 15 is connected to an open end of the peripheral wall 12b of the motor housing 12. The first plate 15 closes an opening of the peripheral wall 12b of the motor housing 12. The end wall 12a and the peripheral wall 12b of the motor housing 12 cooperate with the first plate 15 to define a motor chamber S1. Accordingly, the housing 11 includes the motor chamber S1.

A first end face 15a of the first plate 15, which is distant from the motor housing 12, has a first recess portion 15c and a second recess portion 15d. The first recess portion 15c and the second recess portion 15d each have a circular hole shape. An inner diameter of the first recess portion 15c is larger than that of the second recess portion 15d. The first recess portion 15c is formed coaxially with the second recess portion 15d. The first recess portion 15c has an inner peripheral surface extending to the first end face 15a from a bottom surface of the first recess portion 15c. The second recess portion 15d has an inner peripheral surface extending to the bottom surface of the first recess portion 15c from a bottom surface of the second recess portion 15d.

The first plate 15 has a first bearing holding portion 20. The first bearing holding portion 20 has a cylindrical shape. The first bearing holding portion 20 protrudes from a center portion of a second end face 15b of the first plate 15 near the motor housing 12 into the motor chamber S1. The first bearing holding portion 20 is formed through the first plate 15 to be open on the bottom surface of the second recess portion 15d. The first bearing holding portion 20 is formed coaxially with the first recess portion 15c and the second recess portion 15d.

The motor housing 12 has a second bearing holding portion 21. The second bearing holding portion 21 has a cylindrical shape. The second bearing holding portion 21 protrudes from a center portion of an inner surface of the end wall 12a of the motor housing 12 into the motor chamber S1. The second bearing holding portion 21 is formed through the end wall 12a of the motor housing 12 to be open on an outer surface of the end wall 12a. The first bearing holding portion is formed coaxially with the second bearing holding portion 21.

The second plate 16 is connected to the outer surface of the end wall 12a of the motor housing 12. The second plate 16 has a shaft insertion hole 16a at a center portion of the second plate 16. The shaft insertion hole 16a communicates with the second bearing holding portion 21. The shaft insertion hole 16a is formed coaxially with the second bearing holding portion 21. The sealing plate 17 has a shaft insertion hole 17a at a center portion of the sealing plate 17. The shaft insertion hole 17a is formed coaxially with the first bearing holding portion 20.

The sealing plate 17 is fitted in the first recess portion 15c and fixed to the first plate 15. The sealing plate 17 closes an opening of the second recess portion 15d. The sealing plate 17 and the second recess portion 15d of the first plate 15 cooperate to define a thrust bearing chamber S2.

The compressor housing 13 has a tubular shape. The compressor housing 13 has a suction port 13a that has a circular hole shape. The compressor housing 13 is connected to the first end face 15a of the first plate 15 with an axis of the suction port 13a coaxial with an axis of the shaft insertion hole 17a of the sealing plate 17 and an axis of the first bearing holding portion 20. The suction port 13a is open on an end face of the compressor housing 13, which is distant from the first plate 15.

In the compressor housing 13, an impeller chamber 13b, a discharge chamber 13c, and a diffuser passage 13d are formed between the suction port 13a of the compressor housing 13 and the sealing plate 17. The impeller chamber 13b communicates with the suction port 13a. The discharge chamber 13c extends about the axis of the suction port 13a around the impeller chamber 13b. The supply pipe L1 is connected to the discharge chamber 13c. The diffuser passage 13d provides communication between the impeller chamber 13b and the discharge chamber 13c. The impeller chamber 13b communicates with the shaft insertion hole 17a of the sealing plate 17.

The turbine housing 14 has a tubular shape. The turbine housing 14 has a discharge port 14a that has a circular hole shape. The turbine housing 14 is connected to an end face 16b of the second plate 16, which is distant from the motor housing 12, with an axis of the discharge port 14a coaxial with an axis of the shaft insertion hole 16a of the second plate 16 and an axis of the second bearing holding portion 21. The discharge port 14a is open on an end face of the turbine housing 14, which is distant from the second plate 16.

In the turbine housing 14, a turbine chamber 14b, a turbine scroll passage 14c, and a communication passage 14d are formed between the discharge port 14a of the turbine housing 14 and the end face 16b of the second plate 16. Accordingly, the housing 11 includes the turbine chamber 14b. The turbine chamber 14b communicates with the discharge port 14a. The turbine scroll passage 14c extends about the axis of the discharge port 14a around the turbine chamber 14b. The discharge pipe L2 is connected to the turbine scroll passage 14c. The communication passage 14d provides communication between the turbine chamber 14b and the turbine scroll passage 14c. The turbine chamber 14b communicates with the shaft insertion hole 16a.

The centrifugal compressor 10 includes a rotating body 29. The rotating body 29 has a rotary shaft 30, a first supporting portion 31, a second supporting portion 32, and a supporting plate 33. The rotary shaft 30, the first supporting portion 31, the second supporting portion 32, and the supporting plate 33 are accommodated in the housing 11.

The rotary shaft 30 is accommodated in the housing 11 with an axis of the rotary shaft 30 coaxial with an axis of the motor housing 12. The rotary shaft 30 has a first end portion 30a, and the rotary shaft 30 extends through the motor chamber S1, the first bearing holding portion 20, the thrust bearing chamber S2, and the shaft insertion hole 17a so that the first end portion 30a protrudes into the impeller chamber 13b. The rotary shaft 30 has a second end portion 30b, and the rotary shaft 30 extends through the motor chamber S1, the second bearing holding portion 21, and the shaft insertion hole 16a so that the second end portion 30b protrudes into the turbine chamber 14b.

A first sealing member 22 is disposed between the shaft insertion hole 17a of the sealing plate 17 and the rotary shaft 30. The first sealing member 22 suppresses leak of air from the impeller chamber 13b toward the motor chamber S1. A second sealing member 23 is disposed between the shaft insertion hole 16a of the second plate 16 and the rotary shaft 30. The second sealing member 23 suppresses leak of air from the turbine chamber 14b toward the motor chamber S1. The first sealing member 22 and the second sealing member 23 are each a seal ring, for example.

The first supporting portion 31 is formed on an outer peripheral surface of the rotary shaft 30 near the first end portion 30a. The first supporting portion 31 is disposed inside the first bearing holding portion 20. The first supporting portion 31 is formed integrally with the rotary shaft 30. The first supporting portion 31 protrudes from the outer peripheral surface of the rotary shaft 30.

The second supporting portion 32 is formed on the outer peripheral surface of the rotary shaft 30 near the second end portion 30b. The second supporting portion 32 is disposed inside the second bearing holding portion 21. The second supporting portion 32 has a ring shape around the rotary shaft 30 and extends from the outer peripheral surface of the rotary shaft 30. The second supporting portion 32 is fixed to the outer peripheral surface of the rotary shaft 30. The second supporting portion 32 is rotatable together with the rotary shaft 30.

The supporting plate 33 is accommodated in the thrust bearing chamber S2. The supporting plate 33 is fixed to the outer peripheral surface of the rotary shaft 30, and extends radially outward from the outer peripheral surface of the rotary shaft 30 so as to have a ring shape around the rotary shaft 30. That is, the supporting plate 33 is formed separately from the rotary shaft 30. The supporting plate 33 is rotatable together with the rotary shaft 30.

The centrifugal compressor 10 includes a compressor impeller 34. The compressor impeller 34 is mounted on the first end portion 30a of the rotary shaft in an axial direction of the rotary shaft 30. The compressor impeller 34 is disposed between the supporting plate 33 and the suction port 13a of the compressor housing 13, on the rotary shaft 30. The compressor impeller 34 is accommodated in the impeller chamber 13b. The compressor impeller 34 is rotated together with the rotary shaft 30.

The compressor impeller 34 compresses air flowed from the suction port 13 in the impeller chamber 13b. That is, the compressor impeller 34 compresses the air as fluid. The air compressed by the compressor impeller 34 is discharged to the discharge chamber 13c through the diffuser passage 13d. The air is discharged into the supply pipe L1 from the discharge chamber 13c. The air is supplied to the fuel cell stack 2 through the supply pipe L1.

The centrifugal compressor 10 includes a turbine wheel 35. The turbine wheel 35 is mounted on the second end portion 30b of the rotary shaft 30. The turbine wheel 35 is disposed between the second supporting portion 32 and the discharge port 14a of the turbine housing 14, on the rotary shaft 30. The turbine wheel 35 is accommodated in the turbine chamber 14b. The turbine wheel 35 is rotated together with the rotary shaft 30. The turbine wheel 35 is rotated by the air flowing from the fuel cell stack 2 to the turbine chamber 14b through the discharge pipe L2, the turbine scroll passage 14c, and the communication passage 14d.

The centrifugal compressor 10 includes a first radial bearing 25 and a second radial bearing 26. The first radial bearing 25 has a cylindrical shape. The first radial bearing 25 is held by the first beating holding portion 20. The second radial bearing 26 has a cylindrical shape. The second radial bearing 26 is held by the second bearing holding portion 21. The first radial bearing 25 and the second radial bearing 26 support the rotary shaft 30 in a radial direction such that the rotary shaft 30 is rotatable relative to the housing 11. The radial direction is a direction perpendicular to the axial direction of the rotary shaft 30.

The centrifugal compressor 10 includes a first thrust bearing 27 and a second thrust bearing 28. The first thrust bearing 27 and the second thrust bearing 28 support the supporting plate 33 in a thrust direction such that the supporting plate 33 is rotatable relative to the housing 11. The thrust direction is a direction parallel to the axial direction of the rotary shaft 30.

The first thrust bearing 27 and the second thrust bearing 28 are accommodated in the thrust bearing chamber S2. The first thrust bearing 27 and the second thrust bearing 28 are disposed so as to hold therebetween the supporting plate 33. The first thrust bearing 27 is disposed between the compressor impeller 34 and the supporting plate 33. The second thrust bearing 28 is disposed on a side of the supporting plate 33 opposite to the compressor impeller 34 in the thrust direction of the rotary shaft 30.

<Motor 40>

The centrifugal compressor 10 includes a motor 40. The motor 40 is accommodated in the motor chamber S1. The motor 40 includes a rotor 41 and a stator 42 that each have a tubular shape. The rotor 41 is fixed to the rotary shaft 30. The stator 42 is fixed in the housing 11. The rotor 41 is disposed radially inside the stator 42 and rotated together with the rotary shaft 30. The rotor 41 includes a rotor core 41a formed in a cylindrical shape and fixed to the rotary shaft 30, and a plurality of permanent magnets (not illustrated) disposed in the rotor core 41a. The stator 42 surrounds the rotor 41.

The stator 42 includes a stator core 43 and a coil 44. The stator core 43 is formed in a cylindrical shape and fixed to an inner peripheral surface of the peripheral wall 12b of the motor housing 12. The coil 44 is wound around the stator core 43. The coil 44 has coil ends 44e protruding from opposite end faces of the stator core 43. A current flows from a battery (not illustrated) to the coil 44 to rotate the rotary shaft 30 together with the rotor 41. The motor 40 rotates the compressor impeller 34 together with the rotary shaft 30. The motor 40 is disposed between the compressor impeller 34 and the turbine wheel 35 in the axial direction of the rotary shaft 30.

<Introduction Passage 46>

The centrifugal compressor 10 includes an introduction passage 46. The introduction passage 46 is formed in the first plate 15. The introduction passage 46 extends in the radial direction of the rotary shaft 30. A first end of the introduction passage 46 is open on an outer surface of the first plate 15. The first end of the introduction passage 46 is connected to the branch pipe L3. A second end of the introduction passage 46 communicates with the thrust bearing chamber S2.

The air is compressed by the compressor impeller 34 and flows through the supply pipe L1 toward the fuel cell stack 2. The air partially flows into introduction passage 46 through the branch pipe L3. The air flowing through the branch pipe L3 is cooled by the intercooler R1 on the way to the introduction passage 46. The air having flowed into the introduction passage 46 flows into the thrust bearing chamber S2. The air in the thrust bearing chamber S2 flows inside the first bearing holding portion 20. Then, the air having flowed inside the first bearing holding portion 20 is introduced to the motor chamber S1. That is, the air compressed by the compressor impeller 34 is partially introduced to the motor chamber S1 through the introduction passage 46.

<Air Outlet Passage 47>

The centrifugal compressor 10 includes an air outlet passage 47. The air outlet passage 47 is formed in the second plate 16. The air outlet passage 47 extends in the axial direction of the rotary shaft 30. A first end of the air outlet passage 47 is open on an outer surface of the second plate 16. The first end of the air outlet passage 47 communicates with the outside of the housing 11. A second end of the air outlet passage 47 communicates with a portion of the shaft insertion hole 16a closer to the motor housing 12 than to the second sealing member 23. The air in the motor chamber S1 is discharged to the outside of the housing 11 through the second bearing holding portion 21, the shaft insertion hole 16a, and the air outlet passage 47.

<Inverter 50>

The housing 11 includes an inverter case 51. The inverter case 51 has a case body 52 and a cover 53. The case body 52 has a case end wall 52a formed in a plate shape and a case peripheral wall 52b. The case peripheral wall 52b has a tubular shape and extends from an outer peripheral portion of the case end wall 52a. The cover 53 has a plate shape. The cover 53 is connected to the case body 52 so as to close an opening of the case peripheral wall 52b. The case end wall 52a of the case body 52 and the case peripheral wall 52b cooperate with the cover 53 to define an inverter chamber S3. Accordingly, the housing 11 includes the inverter chamber S3.

The inverter case 51 is fixed to the motor housing 12 with an outer surface of the case end wall 52a in contact with an outer peripheral surface of the peripheral wall 12b of the motor housing 12. The inverter chamber S3 is disposed radially outward of the rotary shaft 30 relative to the motor chamber S1.

The centrifugal compressor 10 includes an inverter 50. The inverter 50 is accommodated in the inverter chamber S3. The inverter 50 is disposed radially outward of the rotary shaft 30 relative to the motor 40. The inverter 50 is configured to drive the motor 40.

<Conductive Member 54>

The centrifugal compressor 10 includes three conductive members 54 in the present embodiment. One of three conductive member 54 is illustrated in FIG. 1. The conductive members 54 are each a busbar that has a plate shape. A first end of each of the conductive members 54 is electrically connected to the corresponding one of three motor coil wires 45. The motor coil wires 45 are drawn out from the coil end 44e near the compressor impeller 34 of the coil ends 44e protruding from the opposite end faces of the stator core 43. The three motor coil wires 45 correspond to a U-phase, a V-phase, and a W-phase of the coil 44. The conductive members 54 are electrically connected to the motor coil wires 45 so as to correspond to the U-phase, the V-phase, and the W-phase of the coil 44. Second ends of the conductive members 54 are electrically connected to the inverter 50. Accordingly, the conductive members 54 electrically connect the motor 40 to the inverter 50.

<Insertion Hole 55>

A first insertion hole 56 is formed in the peripheral wall 12b of the motor housing 12. The first insertion hole 56 is formed in a portion of the peripheral wall 12b of the motor housing 12 near the first plate 15. The first insertion hole 56 extends through the peripheral wall 12b. The first insertion hole 56 is open on a portion of the inner peripheral surface of the peripheral wall 12b between the stator core 43 and the first plate 15. The first insertion hole 56 communicates with the motor chamber S1.

A second insertion hole 57 is formed in the case end wall 52a. The second insertion hole 57 extends through the case end wall 52a. A first end of the second insertion hole 57 communicates with the first insertion hole 56. A second end of the second insertion hole 57 communicates with the inverter chamber S3. The conductive members 54 extend through the first insertion hole 56 and the second insertion hole 57. That is, the first insertion hole 56 and the second insertion hole 57 cooperate to form an insertion hole 55 that extends through the housing 11 and through which the conductive members 54 are inserted. Accordingly, the centrifugal compressor 10 includes the insertion hole 55.

<Resin Member 59>

As illustrated in FIGS. 2 and 3, the centrifugal compressor 10 includes a resin member 59. The resin member 59 is fixed to the housing 11 while holding the conductive members 54, and seals the insertion hole 55 around the conductive members 54. The resin member 59 includes a first resin portion 60 and second resin portions 70.

<First Resin Portion 60>

The first resin portion 60 is made of synthetic resin, specifically thermoplastic resin. For example, the first resin portion 60 is made of polyphenylene sulfide (PPS) resin. The first resin portion 60 has a holding portion 61 and fixed portions 62.

The holding portion 61 covers a part of each of the conductive members 54. Specifically, the holding portion 61 has three holding holes 63. One of the three holding holes 63 is illustrated in FIG. 2. The conductive members 54 extend through the holding holes 63. Inner peripheral surfaces of the holding holes 63 are in close contact with outer peripheral surfaces of the conductive member 54. The holding portion 61 holds the conductive members 54 extending through the holding holes 63. Accordingly, the first resin portion 60 holds the conductive members 54. The first resin portion 60 electrically insulates the conductive members 54 side-by-side with each other. The holding portion 61 has a first contact surface 61a. The first contact surface 61a has a flat surface shape. The holding holes 63 are open on the first contact surface 61a.

The first resin portion 60 has two fixed portions 62. The fixed portions 62 each have a plate shape. The fixed portions 62 protrudes from an outer surface of the holding portion 61. The fixed portions 62 have second contact surfaces 62a that are continuous with the first contact surface 61a of the holding portion 61. The fixed portions 62 have bolt insertion holes 62h. The bolt insertion holes 62h are formed through the fixed portions 62 in a thickness direction of the fixed portions 62. Bolts 64 are inserted to the bolt insertion holes 62h. The bolts 64 extending through the bolt insertion holes 62h are screwed into the case end wall 52a with the first contact surface 61a of the holding portion 61 and the second contact surfaces 62a of the fixed portions 62 in contact with an inner surface of the case end wall 52a. Thus, the first resin portion 60 is fixed to the case end wall 52a. The first resin portion 60 is fixed to the housing 11 while holding the conductive members 54. That is, the first resin portion 60 is disposed in the inverter chamber S3 and fixed to the housing 11.

<Gasket 65>

The centrifugal compressor 10 includes a gasket 65. The gasket 65 has a ring shape. For example, the gasket 65 is made of rubber. The gasket 65 is disposed on an outer peripheral portion of the first contact surface 61a. The gasket 65 extends along the outer peripheral portion of the first contact surface 61a. The gasket 65 is attached to the first contact surface 61a so as to surround the three holding holes 63. The gasket 65 seals a joint between the first resin portion 60 and the case end wall 52a. The air flows from the motor chamber S1 into the insertion hole 55. The gasket 65 prevents such air flowing into the insertion hole 55 from flowing from the motor chamber S1 into the inverter chamber S3 through a space between the first resin portion 60 and the case end wall 52a.

<Second Resin Portion 70>

The resin member 59 includes three second resin portions 70 in the present embodiment. Here, in the following description, one of the three second resin portions 70 is focused. The second resin portion 70 is made of thermoplastic polyester elastomer, specifically Hytrel (registered trademark). Accordingly, the second resin portion 70 is made of material having a rubber elasticity. The second resin portion 70 has a Young's modulus smaller than that of the first resin portion 60.

The second resin portion 70 is formed in a ring shape. The second resin portion 70 covers a part of the conductive member 54 so as to surround the part of the conductive member 54. That is, the second resin portion 70 covers the conductive member 54. The second resin portion 70 are disposed between the holding hole 63 and the conductive member 54. An inner peripheral surface of the second resin portion 70 is in close contact with the outer peripheral surface of the conductive member 54. An outer peripheral surface of the second resin portion 70 is in close contact with the inner peripheral surface of the holding hole 63. The second resin portion 70 seals the holding hole 63 of the first resin portion 60 around the conductive member 54. The second resin portion 70 is covered with the first resin portion 60.

A detaching force by which the first resin portion 60 and the conductive member 54 are partially detached from each other is generated due to a difference in a coefficient of linear expansion between the first resin portion 60 and the conductive members 54. An attached force between the second resin portion 70 and the conductive member 54 and an attached force between the second resin portion 70 and the first resin portion 60 are each greater than the detaching force. The second resin portion 70 has a Young's modulus smaller than that of the first resin portion 60.

The first resin portion 60 and the second resin portions 70 are formed integrally with the conductive members 54 by insert-molding. Specifically, in a primary molding process, the second resin portions 70 are formed integrally with the conductive members 54 by the insert-molding. Next, in a secondary molding process, the first resin portion 60 is formed integrally with the conductive members 54 integrated with the second resin portions 70 by the insert-molding. Thus, the first resin portion 60 and the second resin portions 70, and the second resin portions 70 and the conductive members 54 are each coupled by the insert-molding.

Operation in the Present Embodiment

The following will explain an operation of the centrifugal compressor according to the present embodiment.

The air compressed by the compressor impeller 34 is partially introduced to the thrust bearing chamber S2 through the introduction passage 46. The first thrust bearing 27 and the second thrust bearing 28 are cooled by the air flowing from the introduction passage 46 to the thrust bearing chamber S2. The air in the thrust bearing chamber S2 flows inside the first bearing holding portion 20. The first radial bearing 25 is also cooled by the air flowing inside the first bearing holding portion 20.

The air flowing inside the first bearing holding portion 20 is introduced to the motor chamber S1. The motor 40 is cooled by the air introduced to the motor chamber S1. The air in the motor chamber S1 flows inside the second bearing holding portion 21. The air flowing inside the second bearing holding portion 21 cools the second radial bearing 26. The air flowing inside the second bearing holding portion 21 is discharged to the outside of the housing 11 through the shaft insertion hole 16a and the air outlet passage 47. Thus, the first thrust bearing 27, the second thrust bearing 28, the first radial bearing 25, the motor 40, and the second radial bearing 26 are cooled by a part of the air compressed by the compressor impeller 34.

The air flowing through the fuel cell stack 2 is discharged to the discharge pipe L2 as exhaust gas of the fuel cell stack 2. The air from the fuel cell stack 2 is discharged to the turbine chamber 14b through the discharge pipe L2, the turbine scroll passage 14c, and the communication passage 14d. The air discharged to the turbine chamber 14b rotates the turbine wheel 35. The rotary shaft 30 is rotated by the rotation of the turbine wheel 35 by the air discharged to the turbine chamber 14b in addition to the rotation of the motor 40. The rotation of the turbine wheel 35 by the air discharged to the turbine chamber 14b assists in rotating the rotary shaft 30. The air having flowed through the turbine chamber 14b is discharged to the outside of the housing 11 through the discharge port 14a.

The air compressed by the compressor impeller 34 is partially introduced into the motor chamber S1, so that a pressure in the motor chamber S1 is higher than that in the inverter chamber S3. The air flowing from the impeller chamber 13b may flow into the motor chamber S1 through the shaft insertion hole 17a, the thrust bearing chamber S2, and the inside of the first bearing holding portion 20. Also in this case, the pressure in the motor chamber S1 is higher than that in the inverter chamber S3.

Thus, the centrifugal compressor 10 may be operated in the state where the pressure in the motor chamber S1 is higher than that in the inverter chamber S3. Here, the detaching force by which the first resin portion 60 and the conductive members 54 are partially detached from each other may be generated due to the difference in the coefficient of linear expansion between the first resin portion 60 and each of the conductive members 54. The air flowing into the insertion hole 55 from the motor chamber S1 flows into the inverter chamber S3 through spaces between the first resin portion 60 and the conductive members 54.

The first resin portion 60 and the second resin portions 70, and the second resin portions 70 and the conductive members 54 are each coupled by the insert-molding. The detaching force by which the first resin portion 60 and each of the conductive member 54 are partially detached from each other is generated due to a difference in a coefficient of linear expansion between the first resin portion 60 and the conductive members 54. The attached force between the second resin portion 70 and the conductive member 54 and the attached force between the second resin portion 70 and the first resin portion 60 are each greater than the detaching force. Accordingly, even when the detaching force by which the first resin portion 60 and each of the conductive member 54 are detached from each other is generated due to the difference in the coefficient of linear expansion between the first resin portion 60 and the conductive members 54, the close contact between the second resin portions 70 and the conductive members 54, and the close contact between the second resin portions 70 and the first resin portion 60 are ensured.

The second resin portions 70 each have the Young's modulus smaller than that of the first resin portion 60. With this property, even when the first resin portion 60 and the conductive members 54 are partially detached from each other, the second resin portions 70 elastically deform easily, following the movements of the conductive members 54 and the first resin portion 60. The elastically deformation of the second resin portions 70 maintain the close contact between the second resin portions 70 and the conductive members 54, and the close contact between the second resin portions 70 and the first resin portion 60. The second resin portions 70 ensure a sealing performance between the conductive members 54 and the first resin portion 60. This prevents the air flowing into the insertion hole 55 from the motor chamber S1 from flowing into the inverter chamber S3 through the spaces between the first resin portion 60 and the conductive members 54.

Advantageous Effect in the Embodiment

The above-described embodiment provides following advantageous effects.
(1) The first resin portion 60 and the second resin portions 70, and the second resin portions 70 and the conductive members 54 are each coupled by the insert-molding. This configuration ensures the close contact between the second resin portions 70 and the conductive members 54, and the close contact between the second resin portions 70 and the first resin portion 60 even when the detaching force by which the first resin portion 60 and the conductive members 54 are partially detached from each other is generated due to the difference in the coefficient of linear expansion between the first resin portion 60 and the conductive members 54. The second resin portions 70 each have the Young's modulus smaller than that of the first resin portion 60. With this property, even when the first resin portion 60 and the conductive members 54 are partially detached from each other, the second resin portions 70 elastically deform easily, following the movements of the conductive members 54 and the first resin portion 60. The close contact between the second resin portions 70 and the conductive members 54, and the close contact between the second resin portion 70 and the first resin portion 60 are maintained. The second resin portions 70 ensure the sealing performance between the conductive members 54 and the first resin portion 60. This prevents the air flowing into the insertion hole 55 from the motor chamber S1 from flowing into the inverter chamber S3 through the spaces between the first resin portion 60 and the conductive members 54. As a result, it is possible to avoid a problem in which condensation generated in the inverter chamber S3 when the air flowing into the inverter chamber S3 is cooled has a negative influence on the inverter 50. Therefore, reliability of the centrifugal compressor is ensured.
(2) The first resin portion 60 is disposed in the inverter chamber S3 and fixed to the housing 11. This configuration improves a durability of the first resin portion 60, because the first resin portion 60 is not exposed to the air at high pressure in the motor chamber S1. Accordingly, the reliability of the centrifugal compressor is further easily ensured.
(3) The first resin portion 60 is disposed in the inverter chamber S3 and fixed to the case end wall 52a of the inverter case 51 by the bolts 64. An assembly in which the resin member 59 holding the conductive members 54 is formed integrally with the inverter case 51 is formed. The inverter case 51 is assembled to the motor housing 12 with the resin member 59 holding the conductive members 54 fixed to the inverter case 51. This improves an assembling work efficiency of the centrifugal compressor 10.

Modified Example

The above-described embodiment may be modified as below. The above-described embodiment and the following modifications may be combined with each other as long as they do not technically contradict each other.

Figure 4:
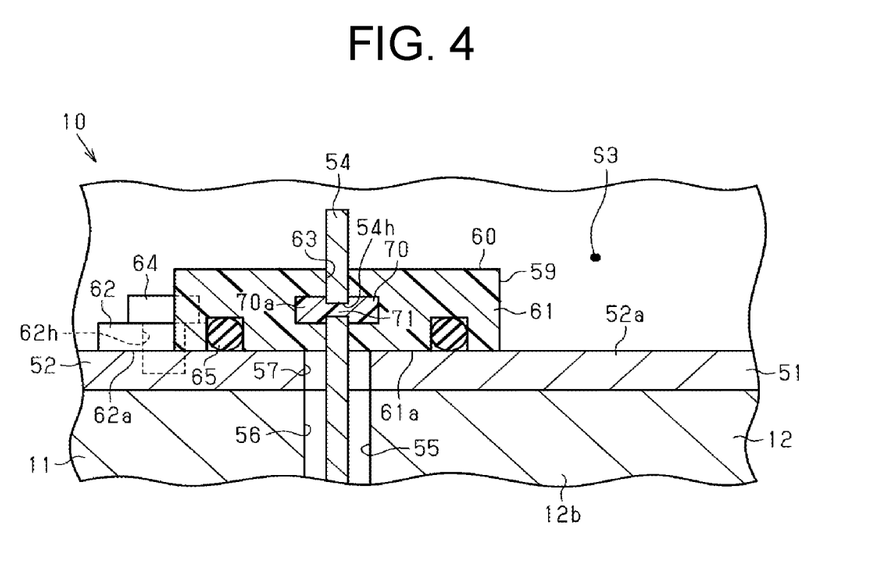
FIG. 4 is an enlarged cross-sectional view illustrating a part of a centrifugal compressor according to another embodiment of the present disclosure.
Figure 5:
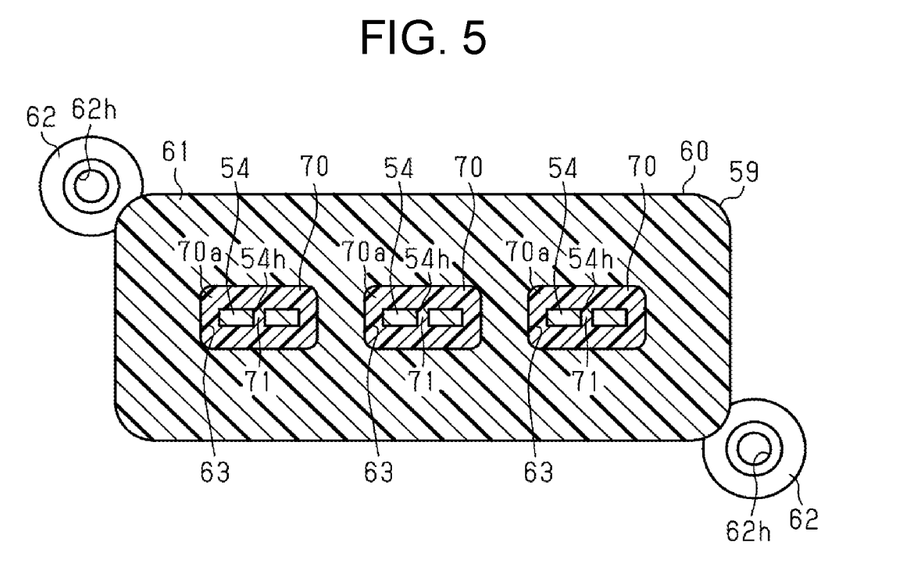
FIG. 5 is a cross-sectional top view illustrating an arrangement of a first resin portion, and second resin portions according to another embodiment of the present disclosure.

As illustrated in FIGS. 4 and 5, each of the conductive members 54 has a through hole 54h extending through the conductive member 54 in a thickness direction thereof, and each of the second resin portions 70 has an anchor portion 71 which is locked to the corresponding through hole 54h. Each of the second resin portions 70 has a sealing main body 70a and the anchor portion 71. The sealing main body 70a has a ring shape surrounding the conductive member 54. The anchor portion 71 has a columnar shape and is disposed inside the through hole 54h. The anchor portion 71 is formed integrally with the sealing main body 70a. An outer peripheral surface of the anchor portion 71 is in close contact with the inner peripheral surface of the through hole 54h.

With this configuration, the anchor portion 71 is locked to the through hole 54h to accurately position the second resin portion 70 relative to the conductive member 54. Accordingly, the sealing performance between the first resin portion 60 and the conductive members 54 is further easily ensured by the second resin portions 70. When the second resin portion 70 is formed integrally with the conductive member 54 by the insert-molding, this configuration suppresses a misalignment of the second resin portion 70 and the conductive member 54 by an injection pressure of the insert-molding.

In the embodiment, for example, a cutout is formed in a side portion of each of the conductive members 54, and the second resin portion 70 may have an anchor portion latched on the cutout. With this configuration, similarly to the configuration illustrated in FIGS. 4 and 5, the second resin portion 70 is accurately positioned relative to the conductive member 54.

In the embodiment, for example, the first resin portion 60 may be made of polybutylene terephthalate (PBT) resin or polycarbonate (PC) resin.

In the embodiment, the resin member 59 has the three second resin portions 70. However, the present disclosure is not limited to this configuration. For example, the resin member 59 may include one second resin portion 70 surrounding all of the three conductive members 54.

In the embodiment, the first resin portion 60 may be disposed in the motor chamber S1 and fixed to the housing 11. For example, the first resin portion 60 may be fixed to the inner peripheral surface of the peripheral wall 12b of the motor housing 12.

In the embodiment, coolant other than the air compressed by the compressor impeller 34 may be introduced to the motor chamber S1.

In the embodiment, the centrifugal compressor 10 need not include the turbine wheel 35.

In the embodiment, the centrifugal compressor 10 may include a compressor impeller instead of the turbine wheel 35. That is, the compressor impellers are mounted to the opposite ends of the rotary shaft 30, and fluid compressed by one of the compressor impellers may be compressed again by the other of the compressor impellers.

In the embodiment, the fuel cell system 1 may be mounted on vehicles other than a fuel cell vehicle. Accordingly, the centrifugal compressor 10 is not limited to the compressor mounted on a fuel cell vehicle, and usage of the centrifugal compressor 10 may be changed as appropriate.

In the embodiment, for example, the centrifugal compressor 10 may be used in a vehicle air conditioner, for example. That is, the fluid compressed by the compressor impeller 34 is not limited to the air, and may be refrigerant, for example.

What is claimed is:

1. A centrifugal compressor comprising:
    a compressor impeller configured to compress fluid;
    a motor configured to rotate the compressor impeller;
    an inverter configured to drive the motor;
    a housing including a motor chamber in which the motor is accommodated and an inverter chamber in which the inverter is accommodated;
    a conductive member electrically connecting the motor to the inverter;
    an insertion hole that extends through the housing and through which the conductive member is inserted; and
    a resin member fixed to the housing while holding the conductive member and sealing the insertion hole around the conductive member,
    a pressure in the motor chamber being higher than a pressure in the inverter chamber, wherein
    the resin member includes:
        a first resin portion fixed to the housing; and
        a second resin portion which is covered with the first resin portion and which covers the conductive member, the second resin portion having a Young's modulus smaller than a Young's modulus of the first resin portion, and
    the first resin portion and the second resin portion, and the second resin portion and the conductive member are each coupled by insert-molding, wherein
    the first resin portion is disposed in the inverter chamber and fixed to the housing, and
    an overall surface of the second resin portion is covered with the first resin portion.

2. The centrifugal compressor according to claim 1, wherein
    the conductive member has a plate shape,
    the conductive member has a through hole extending through the conductive member in a thickness direction of the conductive member, and
    the second resin portion has an anchor portion which is locked to the through hole.

3. The centrifugal compressor according to claim 1, wherein both the first resin portion and the second resin portion are in direct contact with the conductive member.

* * * * *